UNITED STATES PATENT OFFICE.

URIAH CUMMINGS, OF BUFFALO, NEW YORK.

MANUFACTURE OF CEMENT.

SPECIFICATION forming part of Letters Patent No. 342,784, dated June 1, 1886.

Application filed November 2, 1885. Serial No. 181,655. (No specimens.)

*To all whom it may concern:*

Be it known that I, URIAH CUMMINGS, of the city of Buffalo, in the county of Erie and State of New York, have invented new and useful Improvements in the Manufacture of Cement, of which the following is a specification.

Hydraulic or Portland cement is usually manufactured by mixing together clay and carbonate of lime in such proportions that after calcination the resulting compound will contain about sixty-two parts of lime, twenty-eight parts of silicic acid, and ten parts of alumina, by weight. During the process of calcination the carbonic acid contained in the carbonate of lime is expelled, and the silicic acid combines with the bases and forms therewith silicates of lime and alumina, which are afterward reduced to powder and known as "hydraulic" or "Portland" cement. The carbonic acid which is expelled during the process of calcination has no commercial value, and is allowed to escape into the air.

The object of this invention is to reduce the cost of the cement by the manufacture of the sulphuric acid as a valuable by-product; and the invention consists, to that end, in manufacturing cement from clay or silicic acid and sulphate of lime, as will be hereinafter fully set forth, and pointed out in the claim.

In practicing my invention I mix together gypsum or sulphate of lime and clay in the proportion of about twelve hundred and sixty-six pounds of gypsum to four hundred pounds of clay. I prefer to pulverize the gypsum and dry the clay and pulverize the same, then intimately mix the pulverized gypsum and clay and add a small quantity of water, and mold the mixture into blocks substantially in the manner practiced in making Portland cement from carbonate of lime and clay by the well-known dry process. I then subject this mixture to calcination in a suitable kiln. At the high degree of heat which is maintained during the process of calcination the silicic acid contained in the clay expels the sulphuric acid contained in the sulphate of lime and combines with the lime and alumina and produces therewith silicates of lime and alumina, which, upon being reduced to powder, are in every particular a hydraulic or Portland cement. The sulphuric acid is expelled during this process of calcination either in the form of vapor or it is decomposed and forms sulphurous acid, and oxygen, or the escaping gas is a mixture of vaporized sulphuric acid, sulphurous acid, and oxygen, according to the degree of heat which is maintained during the process of calcination, and which may vary somewhat at different times, owing to differences in the quantity or quality of fuel employed, strength of draft, &c. The gases escaping during the process of calcination are cooled in suitable chambers or passages lined with lead, in which the sulphuric acid is condensed and collected. The sulphurous acid, if any, is converted into sulphuric acid in the ordinary manner by means of steam and nitric acid. The sulphuric acid so obtained is then concentrated or further treated in any usual manner practiced in the manufacture of sulphuric acid. The mixture of gypsum and clay above specified produces about seven hundred and eleven pounds of hydraulic or Portland cement and five hundred and eighty pounds of sulphuric acid from every sixteen hundred and sixty-six pounds of the mixture, the balance being moisture, which is expelled. The cost of the sulphate of lime is about the same as that of carbonate of lime, and the cost of manufacturing hydraulic or Portland cement by this improved method is about the same as that of the old method in which carbonate of lime is employed; but the sulphuric acid, which is obtained as a by-product in my improved method, is valuable, and the value which it represents materially reduces the cost of the cement.

In practicing this invention any suitable kiln in which the process of calcination can be carried out may be employed, and any ordinary apparatus may be used for recovering the sulphuric acid.

The condensing and converting chambers are connected with the top of the kiln by a suitable flue, and the waste gases are discharged from the condensing or converting chambers by a stack or chimney or a suitable fan, which maintains a proper draft through the kiln and chambers.

The proportions herein specified are found to be well calculated to produce the desired results; but they may be varied in accordance with the nature of the gypsum-rock and clay employed within certain limits without changing the general results. If the proportion of clay used be too great, the cement will be of an inferior quality; but the sulphuric acid contained in the sulphate of lime will be driven off and recovered. If an excess of gypsum be used, the lime contained therein is in excess of the true combining proportions with the silicic acid, and the sulphuric acid will not all be driven off, and the resulting cement will be inferior in quality by reason of the presence of sulphate of lime, although a small percentage of the latter may be present without exerting any specially deleterious influence.

It is well known that the silica or silicic acid contained in the clay is the active ingredient in the production of the cement, and it is therefore obvious that silica in a finely-pulverized condition may be substituted for the clay, if desired.

I am aware that it has been proposed to manufacture cement from carbonate of lime and clay with the addition of a small quantity of sulphate of lime or some other sulphate for the purpose of rendering the mixture quick-setting, and I do not claim such manufacture or process, as it does not produce sulphuric acid.

I am also aware that it has been proposed to manufacture sulphuric acid by fluxing gypsum with quartz, sand, clay, &c., to a fusible slag for the purpose of driving off the sulphuric acid; but this process is essentially different from the process herein specified, as it produces a valueless slag, which is not a cement.

I claim as my invention—

The herein-described method of manufacturing hydraulic or Portland cement, which consists in calcining a mixture of clay and sulphate of lime, substantially in the proportions specified, as set forth.

Witness my hand this 26th day of October, 1885.

U. CUMMINGS.

Witnesses:
F. N. MERRILL,
CHAS. H. PARSONS.